(No Model.)
O. & O. B. ZWIETUSCH.
PROCESS OF MAKING BEER.
No. 490,056. Patented Jan. 17, 1893.
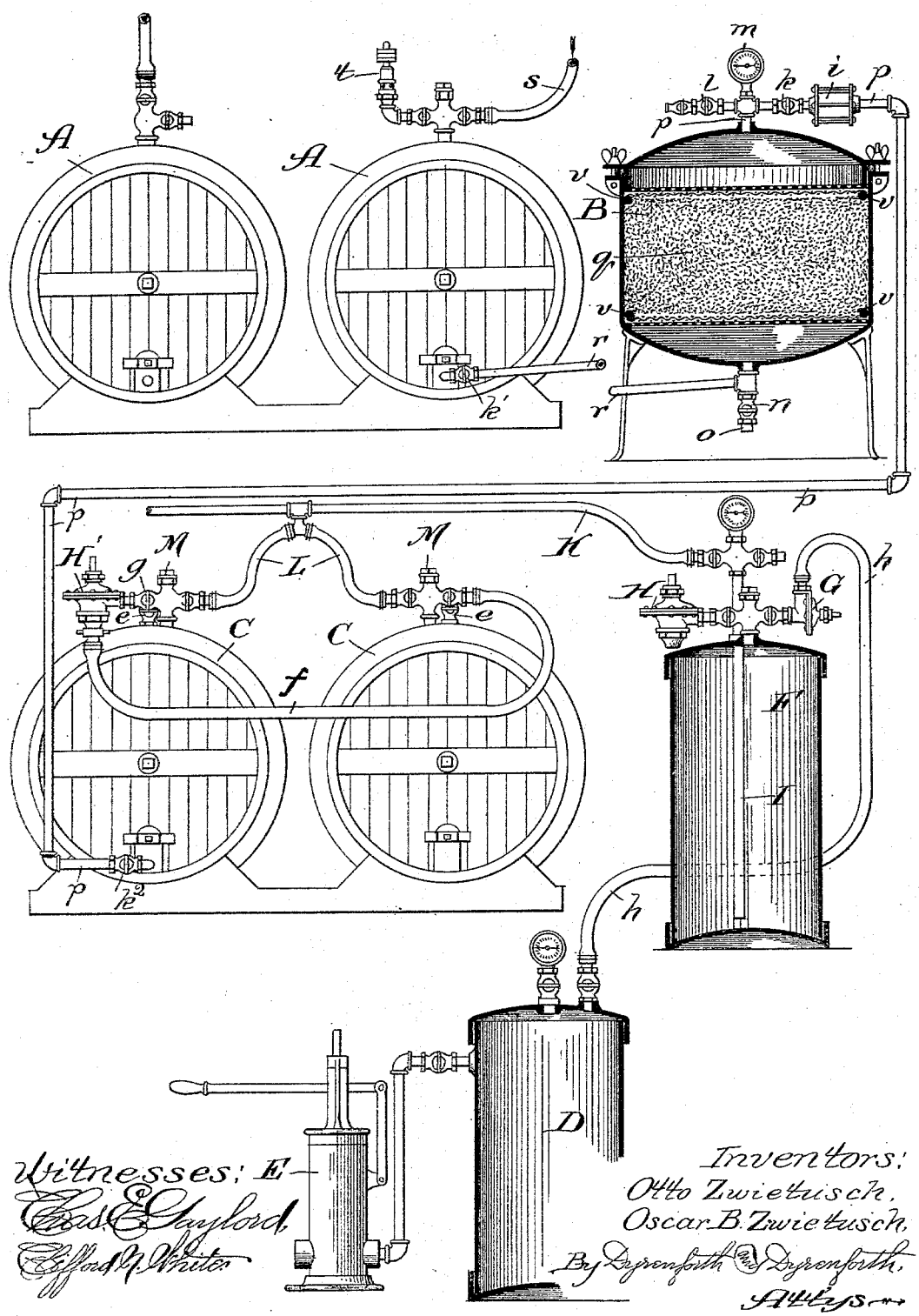
Witnesses:
Chas. E. Gaylord
Clifford J. White
Inventors:
Otto Zwietusch,
Oscar B. Zwietusch,
By Dyrenforth & Dyrenforth,
Attys.

UNITED STATES PATENT OFFICE.

OTTO ZWIETUSCH AND OSCAR B. ZWIETUSCH, OF MILWAUKEE, WISCONSIN.

PROCESS OF MAKING BEER.

SPECIFICATION forming part of Letters Patent No. 490,056, dated January 17, 1893.

Application filed April 13, 1891. Serial No. 388,751. (No model.)

*To all whom it may concern:*

Be it known that we, OTTO ZWIETUSCH and OSCAR B. ZWIETUSCH, citizens of the United States, residing at Milwaukee, in the county of Milwaukee and State of Wisconsin, have invented a new and useful Improvement in Processes of Making Beer, of which the following is a specification.

In the manufacture of beer, as heretofore practiced, after the wort has undergone the main fermentation it has been transferred to "lager" or resting-casks for proper aging, and thereafter to "chip-casks," so-called, wherein it is prepared for the market by the introduction of a proper quantity of "kraeusen," or young beer, to excite a new fermentation and thus give the beer the requisite life and effervescence by the generation therein of carbonic-acid gas. Incidentally the beer is clarified in the chip-casks by means of shavings and isinglass; and usually during the past twelve years the general treatment in these casks has been aided by means of a bunging-apparatus, either applied singly to each cask or connectedly to a series of casks; and within the past three or four years the final operation, with or without the complete clarifying operation in the chip-casks above referred to, has consisted usually of a process of filtration to which the beer is subjected while on its way from the chip-casks to the kegs, whereby special clearness and brilliancy are imparted to the beverage when ready for the market.

Our invention is in the nature of an improvement upon a part of the general process above described, and relates to the treatment of the beer in the stages of its manufacture subsequent to the main fermentation, which we conduct in the usual way, (though preferably for a less prolonged period than has been usual heretofore), and prior to the final filtration, where final filtration is employed; and the object of our invention is, first, to hasten the preparation of the beer for the market, secondly, to produce a product containing less alcohol and more body than the beer heretofore commonly produced in this country, and thirdly, to avoid entirely the use of shavings, the disadvantages of which in the manufacture of beer are generally recognized.

Our invention consists, broadly, in confining the beer after the main fermentation, and generating therein a certain pressure of carbonic-acid gas; then, without permitting a material escape from the beer of its carbonic-acid gas, abstracting from it rapidly most of the remaining particles of yeast, thereby substantially preventing further fermentation, and finally subjecting the beer, for a long enough period to age it suitably, to the inherent pressure adequate to give it the requisite life or effervescence to fit it for the market.

More particularly described, with reference to preferred agencies by which the above general process is carried into effect, our invention consists in subjecting the beer to the main fermentation in open fermenting vats, taking it therefrom, preferably, while it still contains sufficient yeast to generate in the beer, if confined, an adequate pressure of carbonic-acid gas, confining it in closed vessels until it attains an inherent gaseous pressure, preferably of about from five or six pounds to the square inch, then passing it through a filtering medium, thereby abstracting the greater portion of the yeast particles, and thus substantially arresting fermentation, preventing material loss of carbonic-acid gas during the filtering operation by opposing the progress of the beer through the filter and into the receiving vessel by means of a counter-pressure not less than, and preferably somewhat in excess of, the inherent gaseous pressure in the beer, and finally maintaining it in the last-named vessel under automatically controlled pressure of carbonic-acid gas until it is transferred, either directly or through a suitable filtering apparatus, in the usual way, to receptacles for the market.

Our improved process may be properly carried into effect by means of the apparatus represented in the accompanying drawing, which represents, in diagrammatic view, partly sectional, so much of the general brewing apparatus as relates to our process, and which may be understood as standing all upon a common level.

A description of this apparatus and the method of using it is as follows:

A A are closed casks, occupying the same relation to the main fermenting vats that is ordinarily occupied by the resting-casks; that is to say, they are casks into which the beer is transferred after it has undergone the main fermentation to the required degree. The main fermenting vats, which may be understood as being of the ordinary and well-known form, are not shown in the drawing. The casks A are preferably provided with a bunging-apparatus of any one of the usual forms, set preferably to relieve pressure at a somewhat lower degree than bunging-apparatus as commonly employed in brewing, say at from five to six pounds.

The drawing shows the bunging-apparatus in the form of a single pressure-relief valve, $t$, upon the cask in use; but obviously, as in all analogous cases, the connected system of bunging-apparatus may be employed instead; and while it is an advantage to employ some form of bunging-apparatus upon these casks, this is in no way essential to our process.

As the initial step of our process, the beer is tranferred from the main fermenting vats to the casks A, of which there may be one or more; and the product will contain the more extract and less alcohol if this be done while the fermentation is still progressing with sufficient activity to generate in time in the casks A a pressure of from five to six pounds, or somewhat more. A primary object is to attain this pressure in the casks A; and therefore if the action is too slow it may be aided, if desired, by the introduction into the casks A of a fermentative substance, such as "kraeusen," or young beer. As may be inferred, therefore, our process is applicable even where the main fermentation is allowed to run its full usual course in the open vats, though certain advantages are secured by withdrawing it therefrom at an earlier period, as described above.

When the beer has attained the desired pressure in the casks A, it is transferred by means of a forcing pressure through the filter B to the cask C in opposition to a resisting aeriform pressure not less than the gaseous pressure inherent in the beer itself, and preferably somewhat greater. That is to say, if the beer in the cask A is at a pressure of six pounds, an air pressure two or three pounds higher is applied to it through the pipe $s$ in the usual manner of racking beer, the cock leading to the safety valve $t$ being closed, and a resisting aeriform pressure regulated to stand preferably at a small fraction above six pounds is created in the cask C, the filter and connections, so that the beer passes from the cask A through the filter into the cask C between two opposing pressures, neither of which is less than the inherent pressure in the beer, and of which the impelling pressure exceeds the resisting pressure, so that the beer is given the requisite progressive movement, and whereby at the same time the escape therefrom of its imprisoned gas is prevented, thus obviating the production of foam.

The filter B may be of any construction, provided the desired results are obtained, but we prefer a vessel in which the beer enters from the bottom, passes through one or more layers of quartz, wood-fiber or paper-makers' half-stuff, and flows out at the top. Such a filter is represented in the drawing, the beer passing from the cask A into the base of the filter B by way of the pipe $r$, thence upward through the filtering medium $q$ and out at the top by way of the pipe $p$, and thence into the cask C near its base. The vertical pipe $o$ at the base of the filter is for drainage purposes and is provided with a valve, $n$. The outlet-pipe of the filter is provided with a pressure-gage, $m$, a vent-cock, $l$, a valve, $k$, and a glass section, $i$. By the pressure-gage $m$ the pressure within the filter may always be determined.

The vent-cock $l$ performs a two-fold function, one of which is to permit the escape of an aeriform fluid from the filter under circumstances which will be explained further on, and the other of which is to permit the injection of air into the filter when it is desired to train the latter by way of the pipe $o$. The valve $k$ and the valve $k'$ in the pipe $r$ permit the filter to be cut off at will from other portions of the apparatus. By means of the glass-section $i$ in the pipe $p$ the condition of the beer flowing from the filter may be conveniently noted. The packing rings $v$, preferably made of corrugated rubber, are provided to prevent the unfiltered beer from passing along the smooth interior surface of the filter without passing through the filtering medium.

In order to create and maintain the required counter-pressure for the prevention of foaming, and also for the purpose of holding the beer after it has entered the casks C under uniform automatically controlled pressure of carbonic-acid gas until it has attained the desired age, quality and clearness, we prefer to provide these casks with the bunging-apparatus described in the patent granted to Otto Zwietusch, March 3, 1891, No. 447,484. We have accordingly represented the casks C as being provided with a bunging-apparatus of that form, although it is to be understood that while advantageous this form of bunging-apparatus is not an essential requisite to the carrying out of our process. A bunging-apparatus of some form upon the casks C is as essential as it is upon the corresponding casks in the ordinary method of making beer, but whether it is of the single or connected form goes to the matter of convenience mainly. Whatever the form of bunging-apparatus that is employed, means must be provided for establishing in the casks C the requisite counter-pressure for the prevention of foaming, and one of the chief advantages of using the particular bunging-apparatus recommended is that it incidentally effects this result. The bunging-apparatus referred to includes an air-reservoir, D, in which air is stored at a high pressure by means of an air-pump, E, and an auxiliary reservoir, F, connected with the reservoir D through the medium of a pipe, $h$, leading into the top of the reservoir F and provided with a pressure-reducing valve, G, and with a blow-off valve, H. Leading up internally from near the bottom of the reservoir F and out through its top is a pipe, I, which joins with a conduit, K, to which the several casks C are connected by flexible tubes, L, leading from bungs, M, entering the tops of the casks and provided with cut-off valves. It is desirable for reasons that will appear farther on to have each bung provided with a branch, $g$, having a valve to which a pressure relief valve, H', or hose, $f$, may be coupled at will, and to provide the highest point of the cask with a vent-cock, $e$.

The operations of the devices last described are as follows: The casks C are filled one at a time, and we will assume that the left-hand cask is the one to be filled. In this case the communication between the reservoir D and reservoir F is opened, and, with the pressure-reducing valve G set to about six pounds and the pressure-relief valve H set to a fraction above six pounds, and with the communications opened through the whole system as far back as the cask A, an aeriform pressure of six pounds is established in the reservoir F, cask C, filter B and connections. If, then, beer is forced by the usual racking pressure out of the cask A, the cock $k'$ being opened to permit this to be done, the beer will pass through the filter and into the cask C against a counter-pressure of a fraction above six pounds, the aeriform fluid displaced passing off by way of the pressure-relief valve H. When the cask has been filled the valve $k^2$ is closed, cutting off communication with the filter, and the beer in the cask is allowed to remain under the pressure established by the bunging-apparatus until it has attained the proper age and quality. During this time it will of itself, without the use of clearing agents, such as isinglass, become as clear as beer is required to be before being subjected to a process of final filtration. Moreover, after it has been allowed to attain proper age it must necessarily be of superior quality, partly because of its freedom from the taint of shavings, and partly because the effects of aging will have been in no way impaired by refermentation. As is well-known, each refermentation produces fresh turbidity, and this is especially the case where "kraeusen," or young beer, is used as the excitant of the refermentation, on account of the hop-tar contained therein. The reservoir D may contain either air or carbonic-acid gas, and, while more expensive, a counter-pressure of carbonic-acid gas is in some respects preferable to a counter-pressure of atmospheric air. Where a counter-pressure of carbonic-acid gas is desired it may be secured wholly or substantially dissociated from air by causing the carbonic-acid gas from the reservoir D to displace the air in the cask C, filter B and connections before the beer is admitted. This is done by opening the valves which establish communication between the auxiliary reservoir F, cask C and filter B. Thus carbonic-acid gas fills the cask C, filter and connections at the pressure contained in the bunging-apparatus, and being heavier than atmospheric air displaces and expels the latter through the opened vent-cock $e$ upon the cask C and through the opened vent-cock $l$ upon the filter B. When the atmospheric air has been wholly displaced, the vent-cocks $e$ and $l$ are closed and the proper counter-pressure being thus established, the operation of filling the cask through the filter is proceeded with in the manner above described. After the filling of the first cask of a series, the pipe $p$ is detached from that cask and connected to a second cask, the air in which may previously be expelled by opening its vent-cock $e$ and admitting to its interior carbonic-acid gas from the bunging-apparatus. A better method, however, for supplying casks, after the first cask, preliminarily with carbonic-acid gas is to transfer to them the carbonic-acid gas displaced from the preceding cask by the ingress thereinto of beer. The mechanism for effecting this is represented in the drawing and its construction has been described. It comprises the pressure-relief valve H', which is attachable to one of the branches of the bung M, and is connected to one end of the flexible tube $f$, which at its other end may be connected to the free branch of the bung M upon the adjacent cask. During the filling of the cask C in this case, communication with the permanent bunging-apparatus is cut off and the escape of the displaced carbonic-acid gas takes place through the pressure-relief valve H', whence it passes by way of the flexible pipe $f$ into the adjacent empty cask, the vent-cock $e$ upon the latter cask being left open to permit the displacement of air. As the inner end of the vent-cock $e$, through which the air escapes, is slightly higher than the inner end of the bung M, through which the carbonic-acid gas enters, the cask eventually becomes filled with the latter fluid at its normal pressure. When the first cask C has been filled, its communication with the permanent bunging-apparatus is opened, and its communication with the temporary relief-valve is cut off. The latter and its flexible pipe are then disconnected and similarly attached to the cask that has been preliminarily filled with carbonic-acid gas and the cask which succeeds it, when the operation of filling is proceeded with as above, and so on through the series.

By following our process of manufacture above described, not only is the quality of the product improved, but the time and cost of manufacture are materially lessened. It will be seen that our process throughout wholly avoids everything in the nature of a forcing step, and also everything in the nature of an artificial effect upon the finished product; but causes the beer to attain the proper quality with the proper life, by following a natural and progressive course to completion, everything which could tend to sacrifice quality to appearance being carefully avoided.

The use of the particular bunging-apparatus shown and described is a very valuable aid to the process, not only while the process itself is in actual progress, but also subsequently; since any deficiency of pressure in any cask, whether caused by leakage or the annexation of additional casks to the series, is instantly compensated for by a retrogression of the accumulated gas in the auxiliary reservoir F, brought about by the action of air or carbonic-acid gas, as the case may be, from the reservoir D through the pressure-reducing valve G. Thus the beer may be maintained in the casks C for the required period under a pressure almost absolutely uniform, without being subject to the disturbing irregularities which, with an ordinary bunging-apparatus, can not be wholly avoided even with the exercise of the utmost care; and it is a fact well-known in the art of brewing that the keeping of beer under a steady and uniform pressure of carbonic-acid gas is in itself an effective means of clarification. Of course, if desired, several casks C may be simultaneously filled and all governed by the same bunging-apparatus. Such an application would involve no change whatever beyond a multiplication, where required, of the agencies described for carrying out the process.

What we claim as new and desire to secure by Letters Patent is—

1. The method of making beer, which consists in fermenting wort, then confining it and generating in it an adequate pressure of carbonic acid gas, as set forth, then removing yeast from it while retaining the gas, and finally holding it under pressure to fit it for the market, substantially as described.

2. The method of making beer, which consists in subjecting it to the main fermentation, then confining it and generating in it a suitable pressure of carbonic acid gas, as set forth, then filtering it to remove yeast and thereby substantially arrest fermentation, meanwhile preventing material loss from the beer of carbonic-acid gas, and finally maintaining the beer in confinement under substantially uniform pressure of carbonic-acid gas until it is transferred to receptacles for the market, substantially as described.

3. The method of making beer, which consists in subjecting it to the main fermentation, removing it from the fermenting vats while it still contains sufficient yeast to generate by continued fermentation, if confined, a certain pressure, such as set forth, confining it and allowing the fermentation to continue until the required pressure has been attained, then substantially checking the fermentation, without material loss of gas, by passing the beer through a filter against a counter-pressure not less than the inherent gaseous pressure in the beer, and finally maintaining it under a substantially uniform pressure of carbonic acid gas adequate to give to it the degree of life and effervescence required for the market, substantially as described.

OTTO ZWIETUSCH.
OSCAR B. ZWIETUSCH.

In presence of—
FRED. W. BOCK,
EMIL SCHINZ.